April 14, 1936.  H. C. BOWEN  2,037,455
BRAKE
Filed Dec. 30, 1931
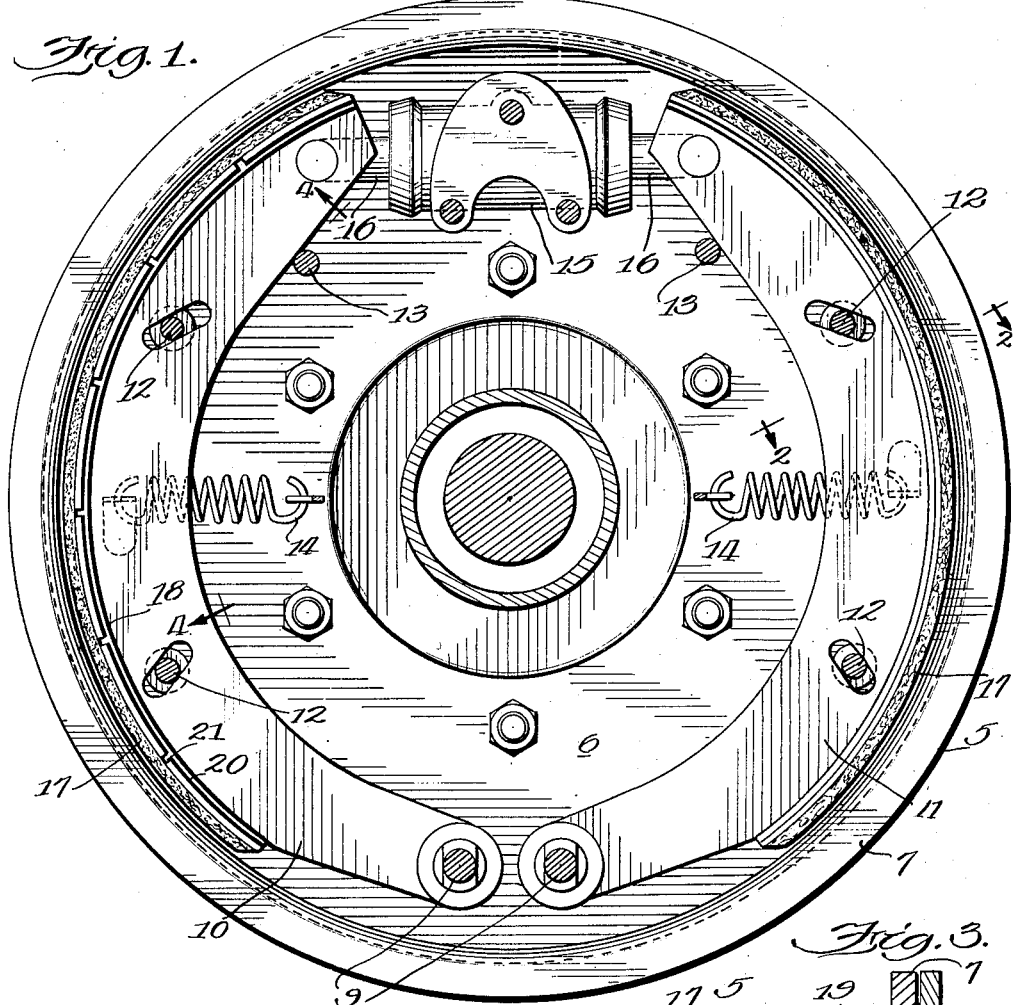
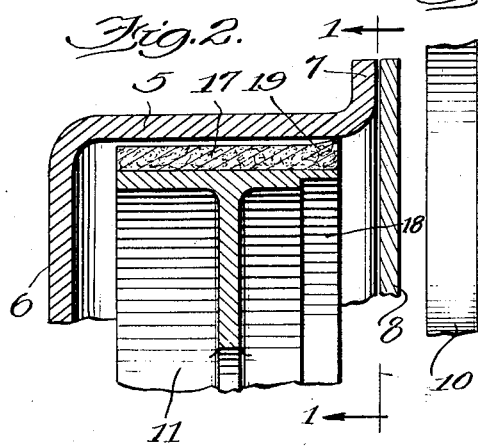
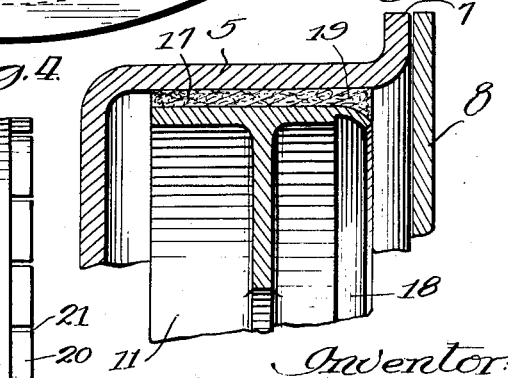
Inventor
Herbert C. Bowen
By Williams, Bradbury,
McCaleb & Hinkle.
Attys.

Patented Apr. 14, 1936

2,037,455

UNITED STATES PATENT OFFICE 2,037,455

BRAKE

Herbert C. Bowen, Detroit, Mich., assignor to Hydraulic Brake Company, Los Angeles, Calif., a corporation of California Application December 30, 1931, Serial No. 583,869

17 Claims. (Cl. 188—78)

My invention relates to brakes and is particularly concerned with means for eliminating the shrill noise or so-called squeal which so commonly results from an application of braking elements and which is so disagreeable and annoying when created by the brakes of an automotive vehicle.

Numerous and varied explanations for brake squeal have been advanced and many attempts have been made to overcome it. I have found that one form of brake squeal is caused by the vibration of the brake drum and shoe when they are only slightly engaged, and an object of my invention is to eliminate such vibration.

Another object is to provide a brake mechanism which will not vibrate when the brake is lightly applied and which will be economical to manufacture.

Another object is to provide a brake mechanism which will not vibrate upon light application and which has no more parts than are utilized in the brake mechanisms now in service.

Another object is to provide a brake shoe which can be substituted for the brake shoes now in use and which will prevent squealing of the brakes upon light application.

Other objects and advantages will become apparent as the description proceeds.

In the drawing,

Fig. 1 is an elevation taken on the line 1—1 of Fig. 2, showing the brake mechanism commonly associated with the wheel of an automotive vehicle;

Fig. 2 is a sectional view taken on the line 2—2 of Fig. 1, showing the parts in normal inoperative position;

Fig. 3 is a view similar to Fig. 2, but showing the parts engaged; and

Fig. 4 is a fragmentary view taken on the line 4—4 of Fig. 1.

Referring to the drawing, I have shown a brake drum 5 closed at one edge by the portion 6, which is affixed to the wheel or other rotating part of a vehicle. The opposite edge of the drum 5 is open and is reinforced by the up-turned portion 7. Cooperating with the drum 5 to form a substantially closed chamber is a pan 8 carrying pins 9 on which brake shoes 10 and 11 are pivotally mounted.

The pan 8 also carries suitable guides 12, stops 13, and one end of each of the retractile springs 14. In the embodiment shown in the drawing, the brake shoes are forced into engagement with the brake drum by a hydraulic motor cylinder 15, which is attached to the pan 8 and connected with a suitable master cylinder by the usual conduit means.

The brake shoes 10 and 11 are T-shaped in cross section, the vertical portion of the T being a depending web of arcuate shape. One end of this web is mounted on a pivot pin 9 and the other end of the depending web is connected with a piston rod 16. The horizontal portion of the T provides the face of the brake shoe which is opposed to the brake drum 5, and to which the brake lining 17 is suitably attached by rivets or other well known means. The brake lining 17 may be of any of the kinds now in common use, or may be of any other type which is suitable for the purpose.

The edge of the shoe 11 which is adjacent the open side of the drum is cut away, as indicated at 18, to provide a relatively thin edge. This thin edge is slightly flexible so that when the brake shoe is operated by the motor cylinder 15 to bring the brake lining into engagement with the brake drum, this edge flexes backwardly, as indicated in Fig. 3, when heavy pressure is exerted on the brake lining, thereby partially relieving the pressure on that part of the brake lining 19 which is immediately associated with the thin edge 18.

This relief of pressure reduces the wear on the edge 19 of the brake lining, so that after the brake lining has been in use for a short period of time this edge of the brake lining is less worn and therefore thicker than the remainder of the brake lining.

The operation of my invention is as follows. When the brakes are lightly applied the edge 18 of the brake shoe maintains its normal position and the entire surface of the brake lining is subjected to equal pressure and equal wear. However, as soon as heavy pressure is applied to the brake lining, the edge 18 of the brake shoe flexes inwardly, as indicated in Fig. 3, and partially relieves the pressure on the adjacent edge 19 of the brake lining, thereby greatly reducing the wear on this part of the brake lining. After the brake lining has been in use a short time the rest of the brake lining is worn down more than the edge 19, so that the exposed surface of the edge portion 19 projects above the exposed surface of the remainder of the brake lining. If now the brakes be applied lightly, the edge portion 18 of the brake shoe will retain its normal position and the thick edge 19 of the lining will be forced against the open or free edge of the drum 5 with greater pressure than exists between the remainder of the brake lining and the drum 5.

This increased pressure at the free edge of the brake drum steadies the free or open edge of the brake drum and holds it against vibration, thus eliminating the objectionable squeal which is frequently caused by the vibration of the free edge of the brake drum on a light application of the brakes.

In some instances it may be desirable to serrate the edge of the brake shoe which is opposed to the free edge of the drum and thus facilitate the flexing of this edge of the brake shoe. I have shown the brake shoe 10 as having a reduced edge portion 20 which is provided with suitably spaced notches or serrations 21 to facilitate flexing of this edge under the desired pressure. The operation of this form of brake shoe is identical with the operation of the brake shoe previously described.

It is to be understood that my invention is not limited to the specific mechanisms shown in the drawings, but may be incorporated in various other forms, and that the scope of my invention is limited solely by the following claims.

I claim:

1. In brake mechanism of the class described, a support, a non-rotatable member movably mounted on said support, a rotatable member, means for moving said non-rotatable member into engagement with said rotatable member, said non-rotatable member having an edge portion of substantially less rigidity than the remaining portion thereof, said edge portion being adapted to flex appreciably when subjected to a unit pressure insufficient materially to deform the remaining portion of said member, a lining carried by one of said members, and means for separating said members.

2. In braking apparatus of the class described, the combination of a support, a non-rotatable member movably mounted thereon, a rotatable member, said non-rotatable member having a serrated edge portion, means for moving said members into braking engagement, a brake lining carried by one of said members and means for separating said members.

3. In brake mechanism of the class described, the combination of a rotatable member, a non-rotatable member movable into braking engagement therewith, means for engaging said members, a brake lining carried by one of said members, one of said members having an edge portion which is sufficiently flexible relative to the remaining portion thereof so as to bend relative to said remaining portion when the members are forcibly engaged by said means, said brake lining engaging said relatively flexible edge portion, and means for separating said members.

4. In braking apparatus of the class described, a brake drum having a closed side and an open side, a brake shoe, a support for said shoe, means for forcing said shoe into engagement with said drum, said shoe having a relatively weak edge engageable with that portion of the drum adjacent the open side thereof, said edge portion being sufficiently weak relative to the remaining portion of the shoe engageable with said drum that it will flex appreciably relative to said remaining portion when the shoe is forcibly engaged with said drum, a lining carried by said shoe, and means for disengaging said shoe from said drum.

5. In braking apparatus of the class described, a rotatable member, a non-rotatable member, a lining carried by one of said members, means for engaging said members to create pressure along said lining, one of said members having an edge of its lining engaging part of much greater flexibility than the remaining portion of said part thereof, said remaining portion being of substantially uniform rigidity, a support for said non-rotatable member, and means for disengaging said members.

6. A brake shoe of the class described, comprising a stiffening web and a portion adapted to carry a brake lining, said portion having an edge of reduced thickness provided with equally spaced serrations.

7. In apparatus of the class described, a brake shoe having an edge portion of reduced thickness, said edge portion being of equal thickness throughout, and the remaining portion being of uniform thickness, whereby said edge portion will flex when subjected to a unit pressure insufficient to cause appreciable deformation of said remaining portion.

8. In apparatus of the class described, a brake shoe having a smooth surface adapted to receive a brake lining, said shoe having an edge portion of reduced uniform thickness adapted to engage that portion of the brake drum adjacent the free edge thereof, the remaining portion of said shoe being of substantially uniform thickness, whereby said edge portion will flex relative to said remaining portion when subjected to a unit pressure insufficient appreciably to deform the latter.

9. In mechanism of the class described, a support, a brake shoe mounted thereon, brake lining carried by said shoe, said shoe having an edge portion of reduced strength, a brake drum having its open edge adjacent said edge portion of the shoe, said open edge of the brake drum being capable of withstanding a pressure greater than that necessary to flex said edge portion of the shoe, and means for applying to said shoe a force sufficient to cause flexing on said edge portion.

10. In mechanism of the class described, the combination of a support, a brake shoe pivotally mounted thereon, said shoe having an edge portion flexing under a predetermined pressure, a lining carried by said shoe, a brake drum having a free edge adjacent said edge portion of the shoe, said free edge of the drum being capable of sustaining a pressure greater than said predetermined pressure, and means for applying to said shoe a force sufficient to create a pressure greater than said predetermined pressure for flexing the edge portion of said shoe.

11. In mechanism of the class described, a brake member having a portion thereof movable with respect to the remaining portion thereof upon the creation of a predetermined pressure, a second brake member, a lining carried by one of said members, and means for engaging portions of said lining between said members at a pressure greater than said predetermined pressure.

12. In apparatus of the class described, the combination of a brake drum having an open end with a brake shoe, said shoe comprising a main portion operable with said drum for braking purposes, and an auxiliary surface portion only cooperable with that portion of the drum adjacent the open end thereof prior to the effective application of the brake for dampening the vibration of the brake drum.

13. In apparatus of the class described, a brake shoe comprising a main surface portion operable for braking purposes, and an arcuate auxiliary surface portion operable prior to the effective application of the brakes for dampening the vibration of the brake drum.

14. In braking mechanism of the class described, the combination of a rotatable member, brake lining adapted to be brought into braking engagement therewith, applying means, and means for reducing the wear on only a small predetermined portion of said lining below the average wear for the rest of the lining, said last-named means being interposed between said lining and said applying means.

15. In brake mechanism of the class described, the combination of a rotatable member, a brake lining adapted to be brought into braking engagement therewith, applying means, and means for reducing the wear on a narrow, arcuate strip of said lining below the average of wear for the remainder of said lining, said last-named means being interposed between said lining and said applying means.

16. In apparatus of the class described, a brake shoe comprising a main surface portion operable for braking purposes, and an edge surface portion operable prior to the effective application of the brakes for dampening the vibration of the brake drum.

17. In mechanism of the class described, a brake member having an arcuate portion thereof movable with respect to the remaining portion thereof upon the creation of a predetermined pressure, a second brake member, a lining carried by one of said members, and means for engaging portions of said lining between said members at a pressure greater than said predetermined pressure.

HERBERT C. BOWEN.